UNITED STATES PATENT OFFICE.

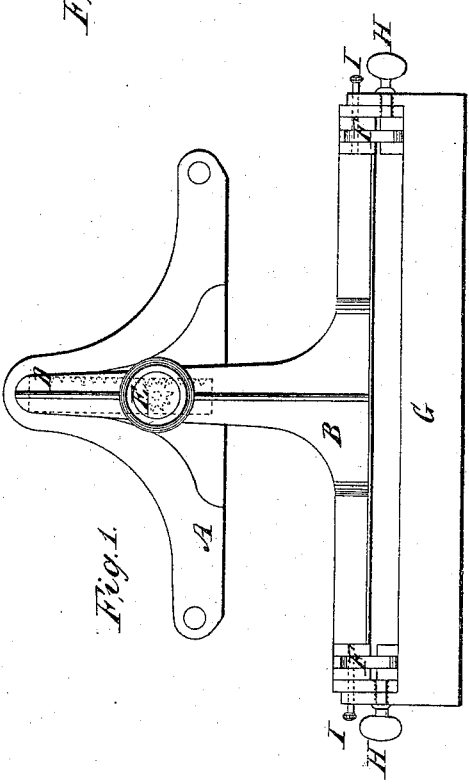

ELBRIDGE G. STANLEY AND JAMES GOODRICH, OF FITCHBURG, MASS.

ANGULAR SAW-GAGE.

Specification forming part of Letters Patent No. 58,498, dated October 2, 1866.

*To all whom it may concern:*

Be it known that we, ELBRIDGE G. STANLEY and JAMES GOODRICH, of Fitchburg, in the county of Worcester and State of Massachusetts, have invented a new, useful, and Improved method of constructing gages or rests for benches, or rests for benches or tables, when saws, cylinders, or other cutting-instruments are used; and we do hereby declare that the following is a full, clear, and exact description of the construction and operation of the same, reference being had to the annexed drawings, making a part of this specification, in which—

Figure 1 shows the plan, Fig. 2 shows the side views, Fig. 3 shows an end view, and Fig. 4 shows sectional view and link motion, as when applied to an ordinary bench or table, with and upon which are used saws, cylinders, or other similar cutting-instruments.

We construct our gages or rests of cast-iron, or any other suitable substances, having the ordinary horizontal and perpendicular plates A, B, and C, with rack and pinion D E.

Our improvement consists in connecting the plates B and C, by means of the links F F, in such a manner that the plate C can be moved on the centers of links F F, and adjusted to the angles desired with the face of the saw, cylinder, or other similar cutting-instrument used with the bench or table, and the aforesaid plates being held in position by the links F F, the screws H H, and pins I I.

The plates A, B, and C, constructed in such a manner as that their relative positions may be changed or adjusted at different angles, and also the rack and pinions above described, have been before known and long in use; are, therefore, no part or parts of our invention.

What we claim as our invention is—

The links F F, when used for and applied to the purpose specified, to wit: to connect the plates B and C, constructed substantially as described and set forth, or in any similar manner.

ELBRIDGE G. STANLEY.
JAMES GOODRICH.

Witnesses:
ALBION NEWELL,
CALVIN WALLACE.